United States Patent [19]

Schaefer et al.

[11] Patent Number: 4,709,201

[45] Date of Patent: Nov. 24, 1987

[54] PORTABLE RADIO BATTERY PACK WITH ON-OFF SWITCH

[75] Inventors: Henry A. Schaefer; Terry N. Garner, both of Lynchburg, Va.

[73] Assignee: General Electric Company, Schenectady, N.Y.

[21] Appl. No.: 790,903

[22] Filed: Oct. 24, 1985

[51] Int. Cl.$^4$ ............................................... H02J 7/00
[52] U.S. Cl. ......................................... 320/2; 455/89; 455/90; 455/349
[58] Field of Search ............... 320/2; 455/89, 90, 343, 455/349; 429/7

[56] References Cited

U.S. PATENT DOCUMENTS

| | | | |
|---|---|---|---|
| 3,694,729 | 9/1972 | Jones | 307/150 |
| 3,728,664 | 4/1973 | Hurst | 320/2 X |
| 3,763,434 | 10/1973 | Blesch et al. | |
| 3,790,810 | 2/1974 | Rogers et al. | 307/66 |
| 4,050,003 | 9/1977 | Owings et al. | 320/2 |
| 4,091,318 | 5/1978 | Eichler et al. | 320/2 |
| 4,095,090 | 6/1978 | Pianezza | 219/441 |
| 4,122,396 | 10/1978 | Grazier et al. | 320/2 X |
| 4,136,309 | 1/1979 | Galberth et al. | 320/2 |
| 4,147,838 | 4/1979 | Leffingwell | 429/1 |
| 4,158,802 | 6/1979 | Rose, II | 320/2 |
| 4,309,644 | 1/1982 | Reimers et al. | 318/139 |
| 4,489,268 | 12/1984 | Beachy | 320/2 |

FOREIGN PATENT DOCUMENTS 0018940 11/1980 European Pat. Off. .
2223876 10/1974 France .
2075247 11/1981 United Kingdom .

OTHER PUBLICATIONS

General Electric application note, entitled "Charging Circuit Design for the Power Stick Rechargeable Battery".
"Netzvergorgung für Batterie-Reiseempfänger", D. Crantz, pp. 749-750, Nov. 1, 1969.
Product Engineering; vol. 38, No. 18; p. 6; Aug. 28, 1967; Morgan-Grampian Pub. Corp; "Electrical/Electronic Power & Control".

Primary Examiner—Patrick R. Salce
Assistant Examiner—Anita M. Ault
Attorney, Agent, or Firm—Robert C. Lampe, Jr.

[57] ABSTRACT

An improved arrangement for powering a two-way portable radio or the like comprises rechargable battery cells and sets of power input and output contacts interconnected to each other and the battery cells in such a way that the output contacts may be electrically connected to the battery cells for powering the radio, or to the input contacts for receiving power directly from a battery charger for dead battery operation while simultaneously recharging the battery cells, all battery pack contacts being electrically isolated from the battery cells in the latter mode of operation.

9 Claims, 4 Drawing Figures

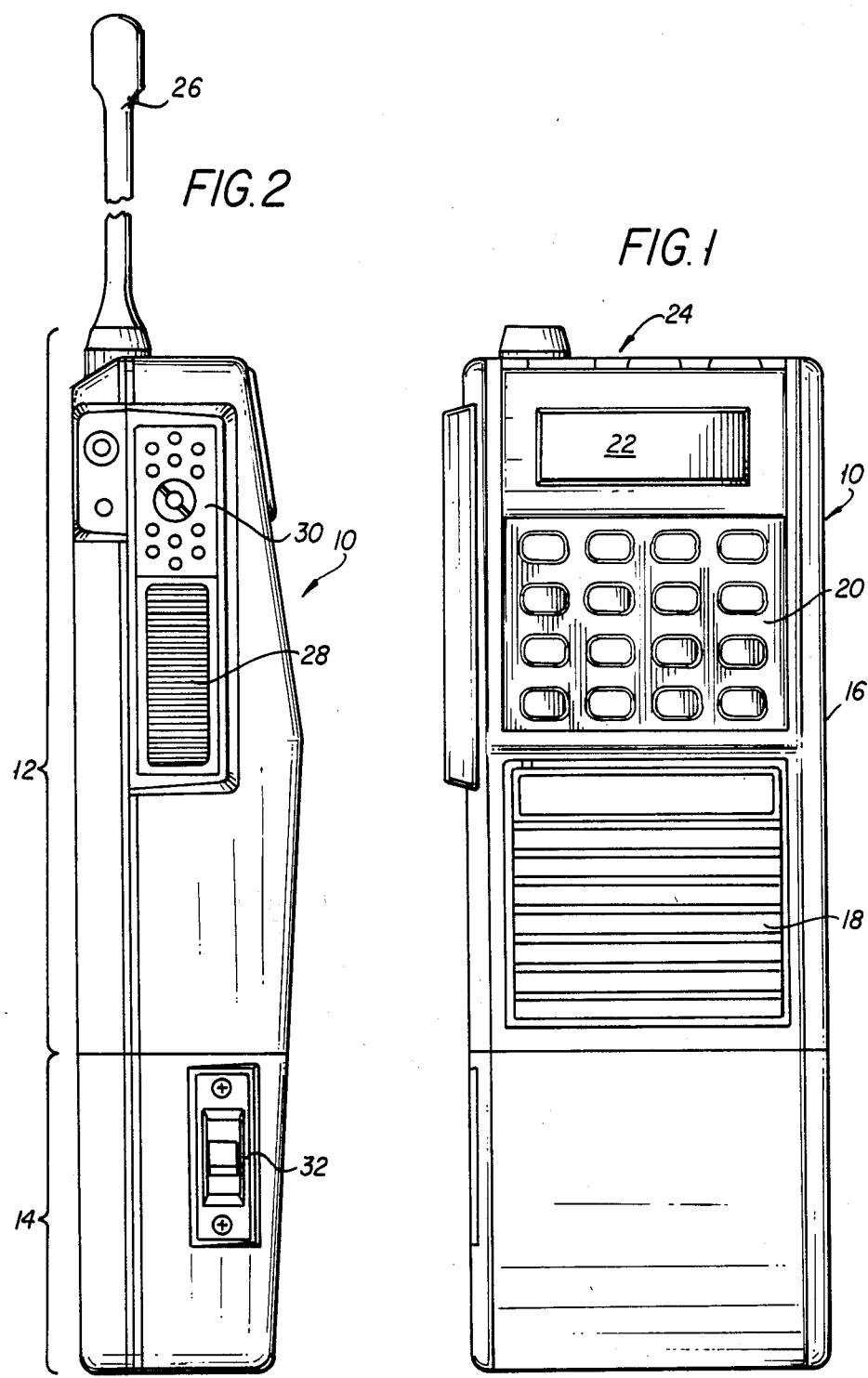

PORTABLE RADIO BATTERY PACK WITH ON-OFF SWITCH

BACKGROUND OF THE INVENTION

The present invention relates to batteries and, more particularly, to rechargeable modular battery packs for use with portable two-way radios.

Portable two-way radios and similar devices are typically powered by rechargeable batteries, such as nickel-cadmium battery cells packaged in a battery pack which is easily removable from the radio for recharging in a battery charger. The size of the battery pack and the number of cells vary, depending on the power and operational life of the battery required between chargings.

It is necessary on portable radios that means be provided for switching off battery power when the radio is not used in order to conserve battery life. It is also desirable to be able to operate the radio in a battery charger circuit, even if the battery is dead or defective, as a back-up mode of operation. Thus, an uncharged or defective battery should not cause loss of communications as long as a battery charger is available. This is referred to as dead battery operation. It is also desirable to be able to electrically isolate the battery terminals when the battery pack is being disconnected from the radio to prevent arcing. This is particularly desirable in the presence of explosive gases which could be ignited by such arcing.

Prior art radios confine the on-off switch to the radio body itself. This location requires that an electrical conductor be routed from the radio's battery contacts to the switch, and thereafter to a radio systems connection and/or distribution point. Generally, the size of the electrical conductor is relatively large in order to keep the electrical losses to a minimum. This presents several problems in a portable hand-held radio. First, a large electrical conductor takes up substantial space in an already crowded portable radio. Second, routing the electrical conductor through the systems portion of the radio usually results in a loss of accessibility to electrical components also located in that area.

Dead battery operation in prior art radios has been provided by means of switching contacts in the radio or isolation diodes in the battery, radio or charger circuits. These components add complexity and/or expense.

SUMMARY OF THE INVENTION

Accordingly, it is the primary object of the present invention to provide an improved arrangement for powering a portable radio in which the battery power switch is not located in the control systems portion of the radio.

It is a further object of the present invention to provide a modular battery pack for a portable two-way radio which can be electrically isolated from the remainder of the radio during battery removal.

It is yet another object of the present invention to provide a modular battery pack arrangement for a portable two-way radio which will accommodate dead battery operation.

These and other objects and advantages will be more clearly understood from the following detailed description, drawings and specific examples, all of which are intended to be typical of rather than in any way limiting to the scope of the present invention.

Briefly stated, the above objectives are accomplished in one embodiment of the present invention in which the modular battery on-off switch is located in the battery pack instead of in the radio control systems module. Two sets of contacts are provided on the modular battery pack—one set interconnects to the radio for providing the radio with power; the other set interconnects with a charger for recharging the battery pack and for dead battery operation.

A first one of the radio contacts is internally electrically connected to the negative battery cell terminal and a first one of the charger contacts (negative). The other radio contact is connected to the on-off switch. One pole of the on-off switch (the ON pole) is connected to the positive battery cell terminal and, through an isolation diode, to a second (positive) charger contact. With the switch in the OFF position, the second radio contact is connected directly to another (third) positive charger contact for dead battery operation. When the battery module is removed from the radio module and the switch is in the OFF position, no power is available at any of the battery pack contacts since the positive (second) charger contact is diode isolated, greatly reducing the risk of accidental battery discharge.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a frontal view of a portable two-way radio having a modular battery pack embodying the subject invention;

FIG. 2 is a side view of the portable two-way radio of FIG. 1;

DESCRIPTION OF THE PREFERRED EMBODIMENT

Figure 3:
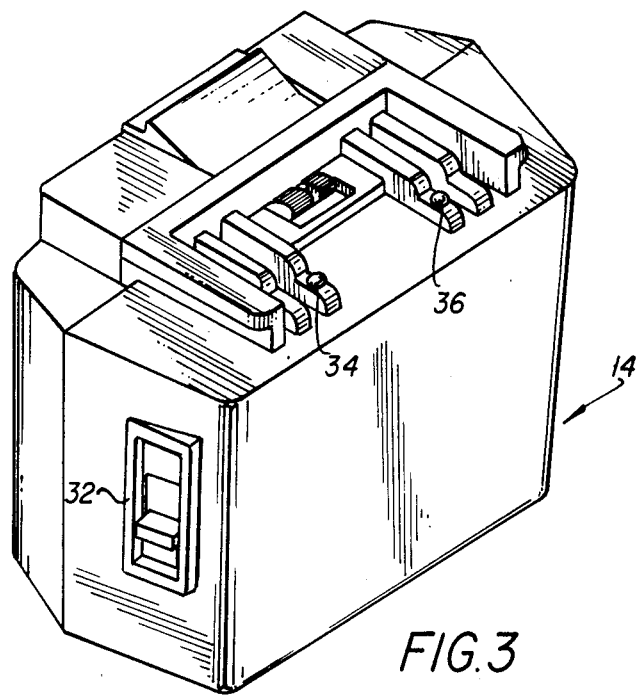
FIG. 3 is a perspective view of a modular battery pack constructed in accordance with the present invention.

Referring to the drawings wherein like numerals correspond to like elements throughout, attention is first directed to FIGS. 1 and 2 wherein a typical portable two-way radio 10 is depicted. Such a radio comprises a radio module 12 which contains a transmitter and receiver (transceiver) and associated electronic control equipment, and a modular battery pack 14 which is attached to and powers the radio module 12. The radio portion 12 has a generally rectangular housing 16 which includes speaker and microphone portion 18, a key pad 20 for "dialing" selected other radios or telephones, an LCD display window 22 for displaying called numbers and other programmed information, a control panel 24 on the top of the radio having switches and/or knobs for squelch control, channel selection, volume and the like, and an antenna 26 for receiving and radiating a radio signal. Push to talk button 28 is located on the side of the radio just below the section 30 containing electrical contacts which mate with a universal device connector (UDC) for accessory attachment and/or remote control of the radio. The UDC contact section 30 of the radio is the subject of a copending, commonly-assigned patent application Ser. No. 791,022 entitled "Portable Two-Way Radio with Split Universal Device Connector Apparatus" by H. A. Schaefer and filed concurrently with the present application, the subject matter of which is incorporated herein by reference.

Referring to FIG. 3, the modular battery pack 14 is shown to have mounted on its side an on-off power switch 32 which controls the flow of current to a pair of output radio contacts 34, 36 on the top of the battery pack. When installed on the radio, contacts 34, 36 are brought into electrical contact with mating terminals on the bottom of the radio housing 16. The internal circuitry of battery pack 14 will now be described in detail with specific reference to FIG. 4.

Figure 4:
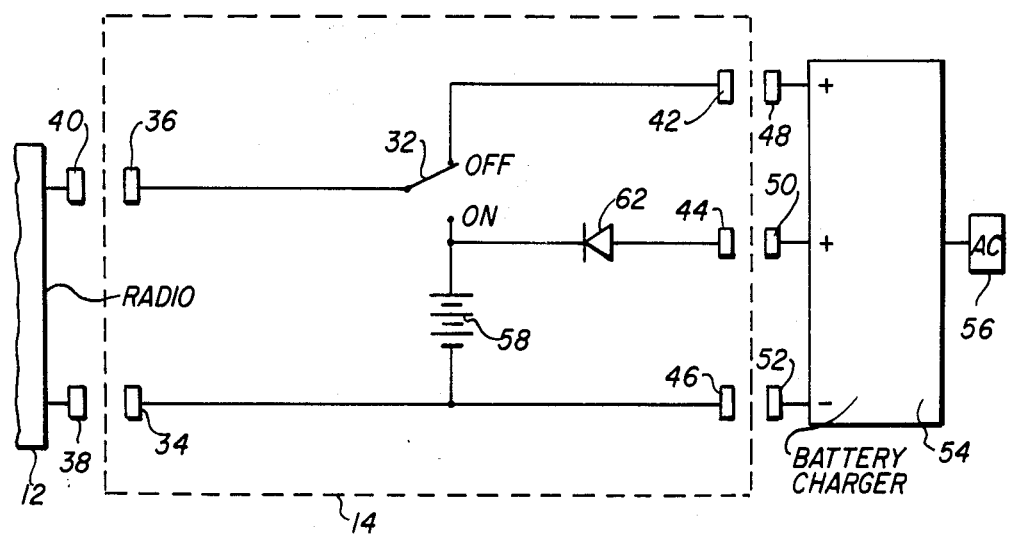
FIG. 4 is a circuit diagram of the modular battery pack of FIG. 3.

As shown in FIG. 4, the battery pack power output contacts 34, 36 are connectable to mating terminals 38, 40, respectively, on radio module 12. A second set of power input contacts 42, 44, 46 interconnects with co-operating terminals 48, 50, 52, respectively, on a battery charger 54 which converts AC current from source 56 to DC current for charging battery pack 14 and for providing dead battery operation of the radio.

Contact 34 is electrically connected to contact 46 and the negative terminal of internal battery cells 58, preferably of the nickel-cadmium type. Contact 36 is electrically connected to switch 32 having an OFF and ON position. With switch 32 in the OFF position, radio module side contact 36 is electrically connected to charger side contact 42. The ON side of switch 32 is electrically connected to the positive terminal of battery cells 58 and to battery side contact 44 through isolation diode 62.

For normal radio operation, contact pairs 34, 38 and 36, 40, are connected and switch 32 is placed in the ON position to provide battery power to the radio module. However, when connected to battery charger 54, power may be delivered from source 56, through switch 32 in the OFF position, to the radio module circuits. Battery cells 58 may also be independently charged through the (+) battery contact 50 with the radio module connected to or disconnected from the battery pack 14. If the battery cells 58 are short circuited or otherwise defective, the radio module 12 may still be operated if connected to the charger through the battery pack with switch 32 in the OFF position.

Note that when battery pack 14 is removed from radio module 12 with switch 32 in the OFF position, no power is available at any of the battery pack contacts 34, 36, 42, 44, 46 because contact 44 is diode isolated. This greatly reduces the risk of accidental arcing during battery pack removal.

In addition, it should be noted that battery power entering radio module 12 may be routed directly to a main distribution point in the most convenient manner because it is no longer necessary to provide a power control in the electronics section of radio module 12.

The best mode contemplated for carrying out this invention has been set forth in the description above. It should be obvious, however, to one skilled in the art that certain changes can be made to the above-described invention without departing from the broad inventive concepts thereof. It is intended that the appended claims cover such variations in the present invention's broader inventive concepts.

We claim:

1. A modular battery pack for powering a radio comprising:
 a rechargeable battery cell;
 a set of power output contacts;
 a set of power input contacts;
 means for electrically interconnecting said input and output contacts and said battery cell such that said output contacts may be alternatively interconnected to said battery cell, or to said input contacts while simultaneously electrically isolating battery cell power from said input and output contacts.

2. A modular battery pack for powering a radio comprising a rechargeable battery cell and sets of input and output contacts interconnected to each other and said battery cell in such a way that said output contacts may either be electrically connected to said battery cell for powering said radio in a first operating mode, or electrically connected to said input contacts for receiving power from a battery charger for dead battery operation in a second operating mode while simultaneously recharging said battery cell, and wherein battery cell power is electrically isolated from said input and output contacts.

3. Modular radio and battery pack apparatus comprising:
 a radio module; and
 a modular battery pack removably attachable to said radio module for providing power thereto through first mating electrical contacts on said radio module and said battery pack and removably attachable to a battery charger through second mating electrical contacts on said battery charger and said battery pack, said battery pack comprising a battery cell, electrical circuitry interconnecting said battery cell with said first and second battery pack electrical contacts, and switch means for interrupting said battery pack electrical circuitry to prevent battery cell power from reaching said first and second battery pack electrical contacts during removal of said battery pack from said radio module.

4. A modular battery pack for providing power for a portable radio to which it may be attached in modular fashion comprising:
 at least one rechargeable battery cell having positive and negative terminals;
 first and second power output contacts for removably electrically interconnecting said modular battery pack to said radio;
 first, second and third power input contacts for removably electrically interconnecting said modular battery pack to a battery charger, said first power input contact being electrically connected to said first power output contact and said negative battery cell terminal; and
 a switch alternatively electrically connecting said second power output contact to said third power input contact in an OFF position or to said positive battery cell terminal and said second power input contact through an isolation diode in an ON position;
 whereby, with said switch in said ON position, battery cell power is available at said first and second power output contacts; and, with said switch in said OFF position and said battery pack unconnected to said charger, no battery cell power is available at any of said power input or power output contacts; and with said switch in said OFF position and said battery pack connected to said charger, said first and second power output contacts are powered while said battery cell may be recharged by said charger.

5. Apparatus for powering a portable radio comprising:
a battery charger for converting AC current to DC current, said charger having two positive output terminals and one negative output terminal; and
a modular battery pack for providing DC power for a radio module comprising:
a rechargeable battery cell;
two power output contacts for interconnecting to said radio;
three power input contacts for electrically connecting to said battery charger terminals, the first power input contact being electrically connected to the first power output contact and said battery cell and for also electrically connecting to the negative one of said charger terminals; and
a switch electrically connecting, in an ON position, the second power output contact with said battery cell and, through an isolation diode, the second power input contact, and further connecting, in an OFF position, said second power output contact with the third power input contact, said second and said third power input contacts each being electrically connectable with different ones of said positive chrager terminals;
whereby, with said switch in said ON position, battery cell power is available at said power output contacts; with said switch OFF and said power input contacts unconnected to said charger, no battery cell power is available at any of said power input and power output contacts; and, with said switch OFF and said power input contacts connected to said charger, dead battery operation of said radio is possible during recharging of said battery cell.

6. A rechargeable, removable battery pack for providing power to a portable radio comprising;
a rechargeable battery cell electrically connected across a first positive power input contact through an isolation diode, and a second negative power input contact to form a charging circuit for receiving power from mating contacts of an attachable battery charger;
a third positive power input contact for receiving power from another mating contact of said battery charger for powering said radio; and
two power output contacts for supplying power to mating radio contacts, said first power output contact being electrically connected to said second negative input contact and said battery, and said second power output contact being electrically connected to a switch operable between an ON position in which said first and second output contacts are placed in parallel electrical relationship with said charging circuit, thereby providing battery cell power to said power output contacts, and an OFF position in which said second output contact is electrically connected to said third positive power input contact, thereby permitting battery charger power to be provided to said power output contacts to directly power said radio and also thereby isolating battery cell power from all of said power input and power output contacts.

7. A modular battery pack comprising:
a rechargeable battery cell;
first and second power output contacts, the first of which is electrically connected to said battery cell and a first power input contact;
a second power input contact electrically connected to said battery cell through an isolation diode so as to provide, in combination with said first power input contact, an electrical charging circuit for said battery cell;
a third power input contact; and
means for switching said second power output contact into alternative electrical connection with said second and third power input contacts; and
wherein said power output contacts provide removable electrical connection between said modular battery pack and a radio module, and said power input connections provide removable electrical connection between said modular battery pack and a battery charger.

8. A rechargeable modular battery pack for providing power to a portable radio module comprising:
a rechargeable battery cell electrically connected through an isolation diode to first and second power input contacts to form a charging circuit for receiving power from mating contacts of an attachable battery charger;
a third power input contact for receiving power from another mating contact of said battery charger for powering said radio module independently of said battery cell; and two power output contacts for supplying power to mating contacts of said radio module, the first such power output contact being electrically connected to said battery cell and said first power input contact, and said second power output contact being electrically connected to a switch for selectively placing said two power output contacts either in parallel electrical connection with said charging circuit, thereby powering said radio by means of said battery cell, or placing said two power output contacts in parallel electrical connection with said first and third power input contacts while isolating battery cell power from all power input and power output contacts.

9. A modular battery pack comprising:
a rechargeable battery cell electrically connected across a pair of power input contacts through an isolation diode, thereby preventing discharge of said battery cell through said pair of power input contacts;
a pair of power output contacts, a first of which is electrically connected to one of said pair of power input contacts; and
means for switching the second of said power output contacts between electrical connection with the other of said pair of power input contacts and a third power input contact which is electrically isolated from said battery cell; and
wherein said power output contacts provide removable electrical connection between said modular battery pack and a radio, and said power input connections provide removable electrical connection between said modular battery pack and a source of DC power.

* * * * *